(12) United States Patent
Graff et al.

(10) Patent No.: US 7,612,870 B2
(45) Date of Patent: Nov. 3, 2009

(54) SINGLE-LENS APERTURE-CODED CAMERA FOR THREE DIMENSIONAL IMAGING IN SMALL VOLUMES

(75) Inventors: Emilio Castano Graff, Pasadena, CA (US); Francisco Pereira, Pasadena, CA (US); Morteza Gharib, San Marino, CA (US); Michele Milano, Tempe, AZ (US)

(73) Assignee: California Institute Of Technology, Pasadena, CA (US)

( * ) Notice: Subject to any disclaimer, the term of this patent is extended or adjusted under 35 U.S.C. 154(b) by 160 days.

(21) Appl. No.: 11/522,500

(22) Filed: Sep. 14, 2006

(65) Prior Publication Data
US 2007/0195162 A1    Aug. 23, 2007

Related U.S. Application Data

(63) Continuation-in-part of application No. 11/365,970, filed on Feb. 28, 2006, which is a continuation of application No. 09/935,215, filed on Aug. 21, 2001, now Pat. No. 7,006,132, which is a continuation-in-part of application No. 09/258,160, filed on Feb. 25, 1999, now Pat. No. 6,278,847.

(60) Provisional application No. 60/078,750, filed on Feb. 25, 1998, provisional application No. 60/717,077, filed on Sep. 14, 2005, provisional application No. 60/717,101, filed on Sep. 14, 2005.

(51) Int. Cl.
*G01C 3/08* (2006.01)
*H04N 9/09* (2006.01)

(52) U.S. Cl. .................. 356/3.13; 356/141.5; 348/262
(58) Field of Classification Search ....... 356/3.01–5.15, 356/28, 139.01–141.5; 348/262, 335
See application file for complete search history.

(56) References Cited

U.S. PATENT DOCUMENTS

| | | | |
|---|---|---|---|
| 3,589,815 A | 6/1971 | Hosterman |
| 3,625,618 A | 12/1971 | Bickel |
| 4,247,177 A | 1/1981 | Marks et al. |
| 4,299,491 A | 11/1981 | Waters et al. |
| 4,375,921 A | 3/1983 | Morander |
| 4,473,750 A | 9/1984 | Oshida et al. |

(Continued)

FOREIGN PATENT DOCUMENTS

DE    198 36 886    3/2000

(Continued)

OTHER PUBLICATIONS

Willert, C.E., et al., "Three-dimensional particle imaging with a single camera", *Experiments in Fluids*, 12(6):353-358, Apr. 1992.

(Continued)

*Primary Examiner*—Isam Alsomiri
(74) *Attorney, Agent, or Firm*—Patterson, Thuente, Skaar & Christensen, P.A.

(57) ABSTRACT

Determining instantaneously three-dimensional coordinates of large sets of points in space using apertures associated with cameras or camera parts. An embodiment associates information from the apertures with different portions of the imager, so that portions on the imager do not overlap.

22 Claims, 15 Drawing Sheets

U.S. PATENT DOCUMENTS

| | | | |
|---|---|---|---|
| 4,494,874 A | 1/1985 | DiMatteo et al. | |
| 4,532,723 A | 8/1985 | Kellie et al. | |
| 4,594,001 A | 6/1986 | DiMatteo et al. | |
| 4,645,347 A * | 2/1987 | Rioux | 356/609 |
| 4,729,109 A | 3/1988 | Adrian et al. | |
| 4,764,016 A | 8/1988 | Johansson | |
| 4,830,485 A | 5/1989 | Penney et al. | |
| 4,919,536 A | 4/1990 | Komine | |
| 4,935,635 A | 6/1990 | O'Harra | |
| 4,979,815 A | 12/1990 | Tsikos | |
| 4,983,043 A | 1/1991 | Harding | |
| 4,988,191 A | 1/1991 | Adrian et al. | |
| 5,018,854 A | 5/1991 | Rioux | |
| 5,075,561 A | 12/1991 | Rioux | |
| 5,110,204 A | 5/1992 | Miles et al. | |
| 5,168,327 A * | 12/1992 | Yamawaki | 356/609 |
| 5,189,493 A | 2/1993 | Harding | |
| 5,270,795 A * | 12/1993 | Blais | 356/609 |
| 5,294,971 A | 3/1994 | Braunecker et al. | |
| 5,333,044 A | 7/1994 | Shaffer | |
| 5,367,378 A | 11/1994 | Harding et al. | |
| 5,440,144 A | 8/1995 | Raffel et al. | |
| 5,491,642 A | 2/1996 | Wormell et al. | |
| 5,500,737 A | 3/1996 | Donaldson et al. | |
| 5,548,419 A | 8/1996 | Adrian et al. | |
| 5,565,914 A | 10/1996 | Motta | |
| 5,568,263 A | 10/1996 | Hanna | |
| 5,581,383 A | 12/1996 | Reichel et al. | |
| 5,610,703 A | 3/1997 | Raffel et al. | |
| 5,646,733 A | 7/1997 | Bieman | |
| 5,661,667 A | 8/1997 | Rueb et al. | |
| 5,675,407 A | 10/1997 | Geng | |
| 5,850,485 A | 12/1998 | Hart | |
| 5,905,568 A | 5/1999 | McDowell et al. | |
| 5,990,934 A | 11/1999 | Nalwa | |
| 6,108,458 A | 8/2000 | Hart | |
| 6,124,990 A | 9/2000 | Suzuki | |
| 6,252,623 B1 | 6/2001 | Lu et al. | |
| 6,278,847 B1 | 8/2001 | Gharib et al. | |
| 6,353,227 B1 | 3/2002 | Boxen | |
| 6,603,535 B1 * | 8/2003 | McDowell | 356/28 |
| 6,674,463 B1 * | 1/2004 | Just et al. | 348/43 |
| 6,737,652 B2 | 5/2004 | Lanza et al. | |
| 7,006,132 B2 | 2/2006 | Pereira et al. | |
| 2002/0149691 A1 | 10/2002 | Pereira et al. | |
| 2006/0209193 A1 | 9/2006 | Pereira et al. | |

FOREIGN PATENT DOCUMENTS

| | | |
|---|---|---|
| EP | 0 631 250 | 12/1994 |
| WO | WO99/44096 | 9/1999 |

OTHER PUBLICATIONS

Adamczyk & Ramai "Reconstruction of a 3-Dimensional Flow Field" Experiments in Fluids, 6, pp. 380-386 (1988).

Eklins et al. "Evaluation of Stereoscopic Trace Particle Records of Turbulent flow Fields" Review of Scientific Instruments, vol. 48, No. 7, pp. 738-746 (1977).

Guezennec, et al. "Algorithms for Fully Automated Three Dimensional Tracking Velocimetry", Experiments in Fluids, 4 (1993).

* cited by examiner

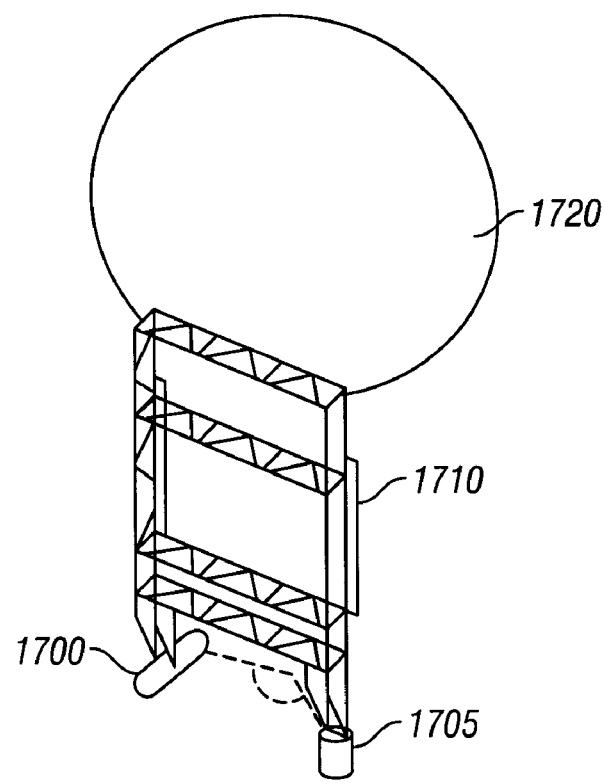
FIG. 17
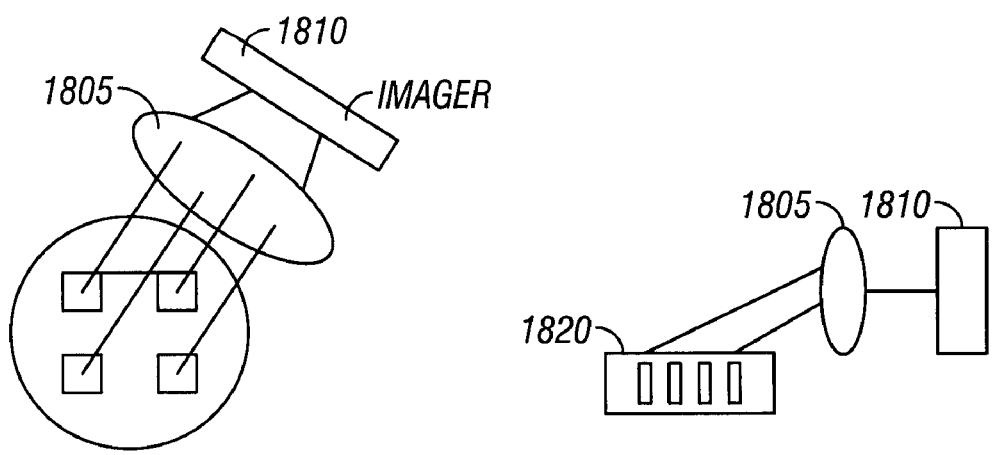
FIG. 18A  FIG. 18B

SINGLE-LENS APERTURE-CODED CAMERA FOR THREE DIMENSIONAL IMAGING IN SMALL VOLUMES

CROSS-REFERENCE TO RELATED APPLICATIONS

This application claims priority to U.S. Provisional Applications 60/717,077 and 60/717,101, both filed on Sep. 14, 2005. This application is also a continuation-in-part of U.S. application Ser. No. 11/365,970, filed Feb. 28, 2006, which is a continuation of application Ser. No. 09/935,215, filed Aug. 21, 2001 (now U.S. Pat. No. 7,006,132), which is a continuation-in-part of U.S. application Ser. No. 09/258,160 filed Feb. 25, 1999 (now U.S. Pat. No. 6,278,847), which claims the benefit of U.S. Provisional Application No. 60/078,750, filed on Feb. 25, 1998.

STATEMENT AS TO FEDERALLY SPONSORED RESEARCH

The U.S. Government may have certain rights in this invention pursuant to Grant No. N00014-97-1-0303 awarded by the U.S. Navy.

The disclosure of the prior applications are considered part of (and are incorporated by reference in) the disclosure of this application.

BACKGROUND

Different techniques are known for three dimensional imaging.

It is known to carry out three dimensional particle imaging with a single camera. This is also called quantitative volume imaging. One technique, described by Willert and Gharib uses a special defocusing mask relative to the camera lens. This mask is used to generate multiple images from each scattering site on the item to be imaged. This site can include particles, bubbles or any other optically-identifiable image feature. The images are then focused onto an image sensor e.g. a charge coupled device, CCD. This system allows accurately, three dimensionally determining the position and size of the scattering centers.

Another technique is called aperture coded imaging. This technique uses off-axis apertures to measure the depth and location of a scattering site. The shifts in the images caused by these off-axis apertures are monitored, to determine the three-dimensional position of the site or sites.

There are often tradeoffs in aperture coding systems.

FIG. 1A shows a large aperture or small f stop is used. This obtains more light from the scene, but leads to a small depth of field. The small depth of field can lead to blurring of the image. A smaller f stop increases the depth of field as shown in FIG. 1B. Less image blurring would therefore be expected. However, less light is obtained.

FIG. 1C shows shifting the apertures off the axis. This results in proportional shifts on the image plane for defocused objects.

The FIG. 1C system recovers, the three dimensional spatial data by measuring the separation between images related to off-axis apertures b, to recover the "z" component of the images. The location of the similar image set is used find the in-plane components x and y.

Systems have been developed and patented to measure two-component velocities within a plane. Examples of such systems include U.S. Pat. Nos. 5,581,383, 5,850,485, 6,108,458, 4,988,191, 5,110,204, 5,333,044, 4,729,109, 4,919,536, 5,491,642. However, there is a need for accurately measuring three-component velocities within a three-dimensional volume. Prior art has produced velocimetry inventions, which produce three-component velocities within a two-dimensional plane. These methods are typically referred to as stereo imaging velocimetry, or stereoscopic velocimetry. Many such techniques and methods have been published, i.e. Eklins et al. "Evaluation of Stereoscopic Trace Particle Records of Turbulent flow Fields" Review of Scientific Instruments, vol. 48, No. 7, 738-746 (1977); Adamczyk & Ramai "Reconstruction of a 3-Dimensional Flow Field" Experiments in Fluids, 6, 380-386 (1988); Guezennec, et al. "Algorithms for Fully Automated Three Dimensional Tracking Velocimetry", Experiments in Fluids, 4 (1993).

Several stereoscopic systems have also been patented. Raffel et al., under two patents, U.S. Pat. Nos. 5,440,144 and 5,610,703 have described PIV (Particle Image Velocimetry) systems for measuring three-component velocities within a two-dimensional plane. U.S. Pat. No. 5,440,144 describes an apparatus using 2 cameras, while U.S. Pat. No. 5,610,703 describes an apparatus and method using only one camera to obtain the three-component velocity data. U.S. Pat. No. 5,905,568 describes a stereo imaging velocimetry apparatus and method, using off-the-shelf hardware, that provides three-dimensional flow analysis for optically transparent fluid seeded with tracer particles.

Most recently, a velocimetry system that measures three-component velocities within a three-dimensional volume has been patented under U.S. Pat. No. 5,548,419. This system is based upon recording the flow on a single recording plate by using double exposure, double-reference-beam, and off-axis holography. This system captures one velocity field in time, thereby preventing acquisition through time, and analysis of time evolving flows.

There therefore still exists a need for a system and method by which accurate three-component velocities can be obtain within a three-dimensional volume using state-of-the-art analysis for any optically transparent fluids seeded with tracer particles.

Three-Dimensional Profilometry is another technique, often used for measuring the three-dimensional coordinate information of objects: for applications in speeding up product development, manufacturing quality control, reverse engineering, dynamical analysis of stresses and strains, vibration measurements, automatic on-line inspection, etc. Furthermore, new fields of application, such as computer animation for the movies and game markets, virtual reality, crowd or traffic monitoring, biodynamics, etc, demand accurate three-dimensional measurements. Various techniques exist and some are now at the point of being commercialized. The following patents describe various types of three-dimensional imaging systems:

U.S. Pat. No. 3,589,815 to Hosterman, Jun. 29, 1971;
U.S. Pat. No. 3,625,618 to Bickel, Dec. 7, 1971;
U.S. Pat. No. 4,247,177 to Marks et al, Jan. 27, 1981;
U.S. Pat. No. 4,299,491 to Thornton et al, Nov. 10, 1981;
U.S. Pat. No. 4,375,921 to Morander, Mar. 8, 1983;
U.S. Pat. No. 4,473,750 to Isoda et al, Sep. 25, 1984;
U.S. Pat. No. 4,494,874 to DiMatteo et al, Jan. 22, 1985;
U.S. Pat. No. 4,532,723 to Kellie et al, Aug. 6, 1985;
U.S. Pat. No. 4,594,001 to DiMatteo et al, Jun. 10, 1986;
U.S. Pat. No. 4,764,016 to Johansson, Aug. 16, 1988;
U.S. Pat. No. 4,935,635 to O'Harra, Jun. 19, 1990;
U.S. Pat. No. 4,979,815 to Tsikos, Dec. 25, 1990;
U.S. Pat. No. 4,983,043 to Harding, Jan. 8, 1991;
U.S. Pat. No. 5,189,493 to Harding, Feb. 23, 1993;
U.S. Pat. No. 5,367,378 to Boehnlein et al, Nov. 22, 1994;

U.S. Pat. No. 5,500,737 to Donaldson et al, Mar. 19, 1996;
U.S. Pat. No. 5,568,263 to Hanna, Oct. 22, 1996;
U.S. Pat. No. 5,646,733 to Bieman, Jul. 8, 1997;
U.S. Pat. No. 5,661,667 to Bordignon et al, Aug. 26, 1997; and
U.S. Pat. No. 5,675,407 to Geng, Oct. 7, 1997.
U.S. Pat. No. 6,252,623 to Lu, Jun. 26, 2001.

If contact methods are still a standard for a range of industrial applications, they are condemned to disappear: as the present challenge is on non-contact techniques. Also, contact-based systems are not suitable for use with moving and/or deformable objects, which is the major achievement of the present method. In the non-contact category, optical measurement techniques are the most widely used and they are constantly updated, in terms of both of concept and of processing. This progress is, for obvious reasons, parallel to the evolution observed in computer technologies, coupled with the development of high performance digital imaging devices, electro-optical components, lasers and other light sources.

The following briefly describe techniques:

The time-of-flight method is based on the direct measurement of the time of flight of a laser or other light source pulse, e.g. the time between its emission and the reception time of the back reflected light. A typical resolution is about one millimeter. Light-in-flight holography is another variant where the propagating optical wavefront is regenerated for high spatial resolution interrogation: sub-millimeter resolution has been reported at distances of 1 meter. For a surface, such technique would require the scanning of the surface, which of course is incompatible with the measurement of moving objects.

Laser scanning techniques are among the most widely used. They are based on point laser triangulation, achieving accuracy of about 1 part in 10000. Scanning speed and the quality of the surface are the main factors against the measurement accuracy and system performance.

The Moiré method is based on the use of two gratings, one is a reference (i.e. undistorted) grating, and the other one is a master grating. The typical measurement resolution is $\frac{1}{10}$ to $\frac{1}{100}$ of a fringe in a distance range of 1 to 500 mm.

Interferometric shape measurement is a high accuracy technique capable of 0.1 mm resolution with 100 m range, using double heterodyne interferometry by frequency shift. Accuracies $\frac{1}{100}$ to $\frac{1}{1000}$ of fringe are common. Variants are under development: shearography, diffraction grating, wavefront reconstruction, wavelength scanning, conoscopic holography.

Moiré and interferometer based systems provide a high measurement accuracy. Both, however, may suffer from an inherent conceptual drawback, which limits depth accuracy and resolution for surfaces presenting strong irregularities. In order to increase the spatial resolution, one must either use shift gratings or use light sources with different wavelengths. Three to four such shifts are necessary to resolve this limitation and obtain the required depth accuracy. This makes these techniques unsuitable for time-dependent object motion. Attempts have been made with three-color gratings to perform the Moiré operation without the need for grating shift. However, such attempts have been unsuccessful in resolving another problem typical to fringe measurement systems: the cross-talk between the color bands. Even though some systems deliberately separate the bands by opaque areas to solve this problem, this is done at the expense of a much lower spatial resolution.

Laser radar 3D imaging, also known as laser speckle pattern sampling, is achieved by utilizing the principle that the optical field in the detection plane corresponds to a 2D slice of the object's 3D Fourier transform. Different slices can be obtained by shifting the laser wavelength. When a reference plane is used, this method is similar to two-wavelength or multi-wavelength speckle interferometry. The measurement range goes from a micrometer to a few meters. Micrometer resolutions are attained in the range of 10 millimeters.

Photogrammetry uses the stereo principle to measure 3D shape and requires the use of bright markers, either in the form of dots on the surface to be measured of by projection of a dot pattern. Multiple cameras are necessary to achieve high accuracy and a calibration procedure needs to be performed to determine the imaging parameters of each of them. Extensive research has been done on this area and accuracies in the order of one part in 100000 are being achieved. Precise and robust calibration procedures are available, making the technique relatively easy to implement.

Laser trackers use an interferometer to measure distances, and two high accuracy angle encoders to determine vertical and horizontal encoders. There exist commercial systems providing accuracies of +/−100 micrometers within a 35-meter radius volume.

Structured light method is a variant of the triangulation techniques. Dots or lines or projected onto the surface and their deformed pattern is recorded and directly decoded. One part over 20000 has been reported.

Focusing techniques that have received a lot of attention because of their use in modern photographic cameras for rapid autofocusing. Names like depth-from-focus and shape-from-focus have been reported. These techniques may have unacceptably low accuracy and the time needed to scan any given volume with sufficient resolution have confined their use to very low requirement applications.

Laser trackers, laser scanning, structured light and time-of-flight methods require a sweeping of the surface by the interrogation light beam. Such a scanning significantly increases the measuring period. It also requires expensive scanning instruments. The Moiré technique requires very high resolution imaging devices to attain acceptable measurement accuracy. Laser speckle pattern sampling and interferometric techniques are difficult and expensive to implement. For large-scale measurements, they require also more time to acquire the image if one wants to take advantage of the wavelength shifting method. Photogrammetry needs a field calibration for every configuration. Furthermore, the highest accuracy is obtained for large angular separations between the cameras, thus increasing the shading problem.

There is thus a widely recognized need for a method and system to rapidly, accurately and easily extract the surface coordinate information of as large as possible number of designated features of the scene under observation, whether these features are stationary, in motion, and deforming. The technique should be versatile enough to cover any range of measurement, and with accuracy comparable to or surpassing that of systems available today. The technique should allow for fast processing speeds. Finally, the technique should be easy to implement for the purpose of low cost manufacturing. As we will describe, the present invention provides a unique alternative since it successfully addresses these shortcomings, inherent partially or totally to the presently known techniques.

SUMMARY

The present system carries out aperture-induced three dimensional measuring by obtaining multiple images through apertures. A complete image detector can be a separate camera associated with each aperture, or a single camera that is used to acquire the different images from the different apertures one at a time, or a single camera that images the different aperture portions on different portions of the imager.

The optical train is preferably arranged such that the aperture coded mask causes the volume to be imaged through the defocusing region of the camera lens.

BRIEF DESCRIPTION OF THE DRAWINGS

These and other aspects will now be described in detail with the accompanying drawings, wherein:

FIG. 17 shows an underwater embodiment.

FIGS. 18A and 18B show different arrangements of apertures.

DESCRIPTION OF THE PREFERRED EMBODIMENT

Figure 1A:
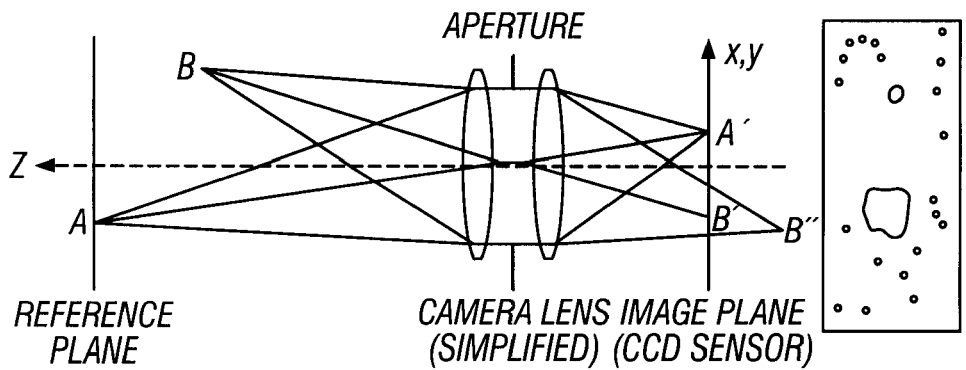
FIGS. 1A-1C show views of different systems for 3 dimensional imaging.
Figure 1B:
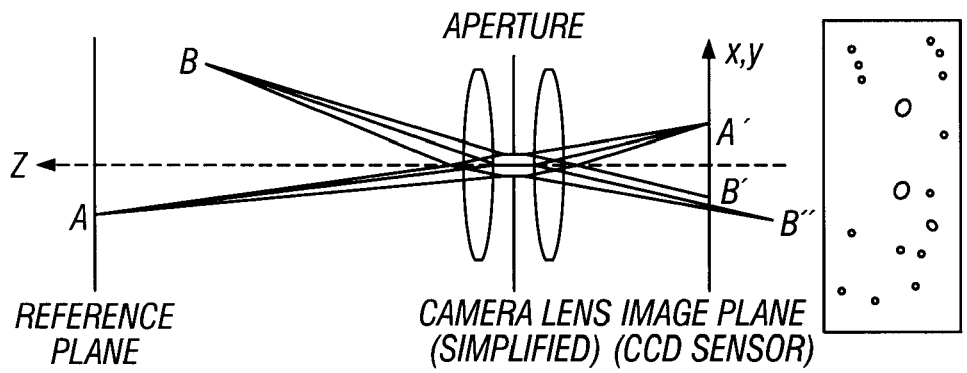
Figure 1C:
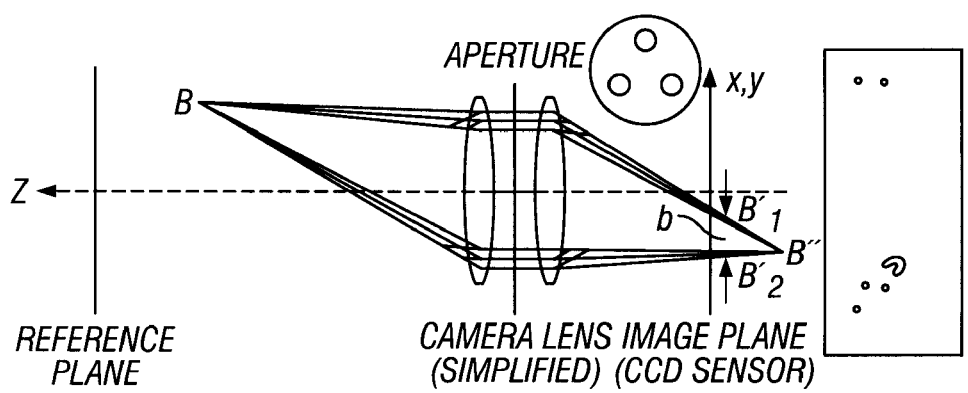
Figure 2:
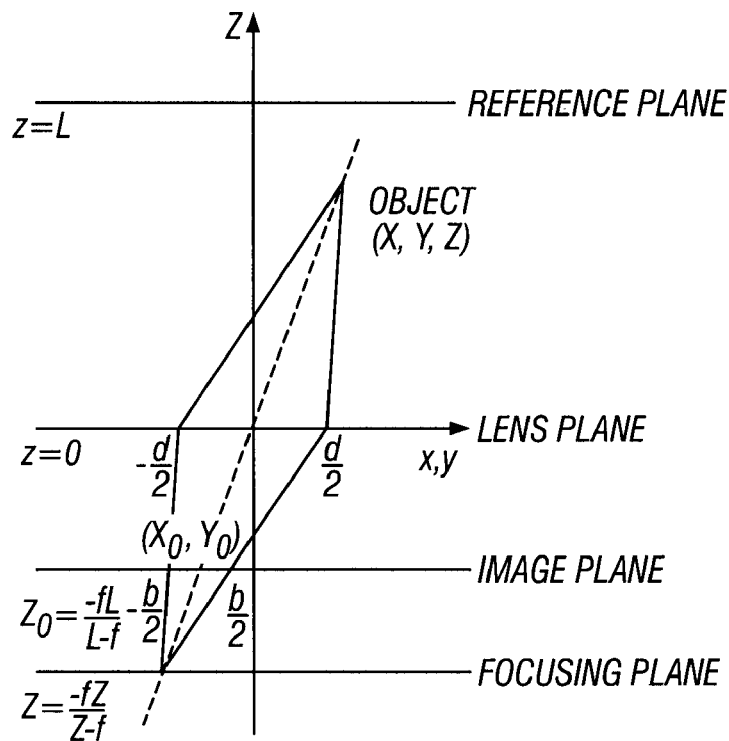
FIG. 2 shows a geometric analysis of a specified lens aperture system.

FIG. 2 shows a geometric analysis in which a camera lens of focal length f is located at z=0. Two small apertures are placed within the lens, separated a distance d/2 away from the optical centerline 200 which also corresponds to the z axis. The apertures are shown as pinholes in this diagram to simplify the model. The theory for larger and more complex apertures would be similar.

The following equations can be determined by using lens laws and self similar triangle analysis:

$$Z=1/((1/L)+Kb) \quad (1)$$

where $$K=(L-f)/(fdL) \quad (2)$$

The remaining two coordinates x, y are found from the geometrical center $(X_0,Y_0)$ of the image pair B' using:

$$X=(-x_0Z(L-f))/(fL) \quad (3)$$

$$Y=(-y_0Z(L-f))/(fL) \quad (4)$$

Solving (1) for the image separation b reveals several interesting performance characteristics of the lens/aperture system:

$$b=1/K((1/Z)-(1/L)) \quad (5)$$

The inventors recognized that if all this information was obtained by a single camera, an image crowding problem could exist. This would limit the system to a lower density of number of images.

The defocusing masses requires multiple spatially-shaped holes. If there are n holes, then each scattering site has been imaged n times onto a single CCD. Hence, n times as many pixels are exposed. This means, however, that the capacity of the technique, i.e. the number of scattering sites that can be imaged, is correspondingly reduced by a factor of n.

The present system addresses this and other issues.

A first aspect addresses the image crowding problem by exposing each of the multiple exposures using a separate camera portion. The camera system can be electronic or photographic based. The separate camera portion requires that a whole camera imaging portion is used to obtain the images from each aperture at each time. This can use multiple separate cameras, a single camera with multiple parts, or a single camera used to obtain multiple exposures at different times.

Another aspect obtains image information about the objects at a defocused image plane, i.e. one which is not in focus by the lens. Since the image plane is intentionally out of focus, there is less tradeoff regarding depth of field.

The first embodiment, as described above, uses image separation to expose each of the multiple exposures to its own electronic or photographic camera portion. The image separation can be effected by color filters, by time coding, by spatial filters, or by using multiple independent cameras.

Figure 3:
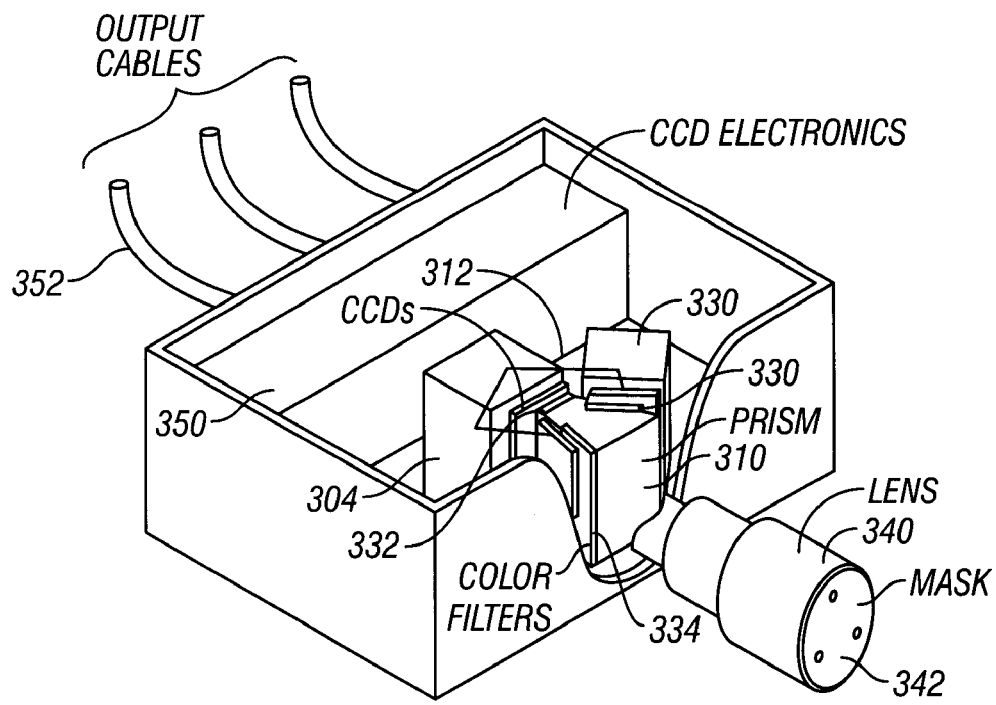
FIG. 3 shows a camera diagram with camera components.

The color filter embodiment is shown in FIG. 3. A color camera and mask combination is shown with three separate CCD cameras 300, 302, 304.

Light is input through mask 342, which includes an opaque aperture plate with three apertures formed therein. In this embodiment, the apertures are generally in the shape of a triangle. The light passes to a lens assembly 340, which directs the light into the chamber that houses the camera.

The color camera uses three monochrome CCD cameras, situated around a three way prism 310 which separates the incoming light according to its colors. A micropositioner assembly 312 is provided to precisely adjust the cameras 300, 302, 304 such that each will view exactly the same area. Once those adjustments are made, the three cameras are locked into place so that any vibration affects each of them the same. Each camera includes an associated band filter. The filter 330 is associated with CCD camera 300, filter 332 is associated with camera 302, and filter 334 is associated with camera 304. Each of these narrow band filters passes only one of the colors that is passed by the coded apertures. The filters are placed adjacent the prism output to correspond respectively to each of the primary colors, e.g. red, green and blue. Hence, the filters enable separating the different colors.

This color camera assembly is used in conjunction with an image lens assembly 340 and a aperture coded mask 342. The system in FIG. 3 shows the aperture coded mask having three mask portions in the form of an equilateral triangle. Each aperture is color coded according to the colors of the camera filters. This color coding can be done by, for example, using color filters on the apertures.

The image from each aperture goes to a separate one of the cameras 302, 304, 300. The output from the camera is processed by the CCD electronics 350 and coupled to output cables shown as 352. These three values are processed using a conventional processing software. The three values can be compensated separately.

While the system describes using three colors and three apertures, it should be understood that any number of colors or apertures could be provided.

Figure 4A:
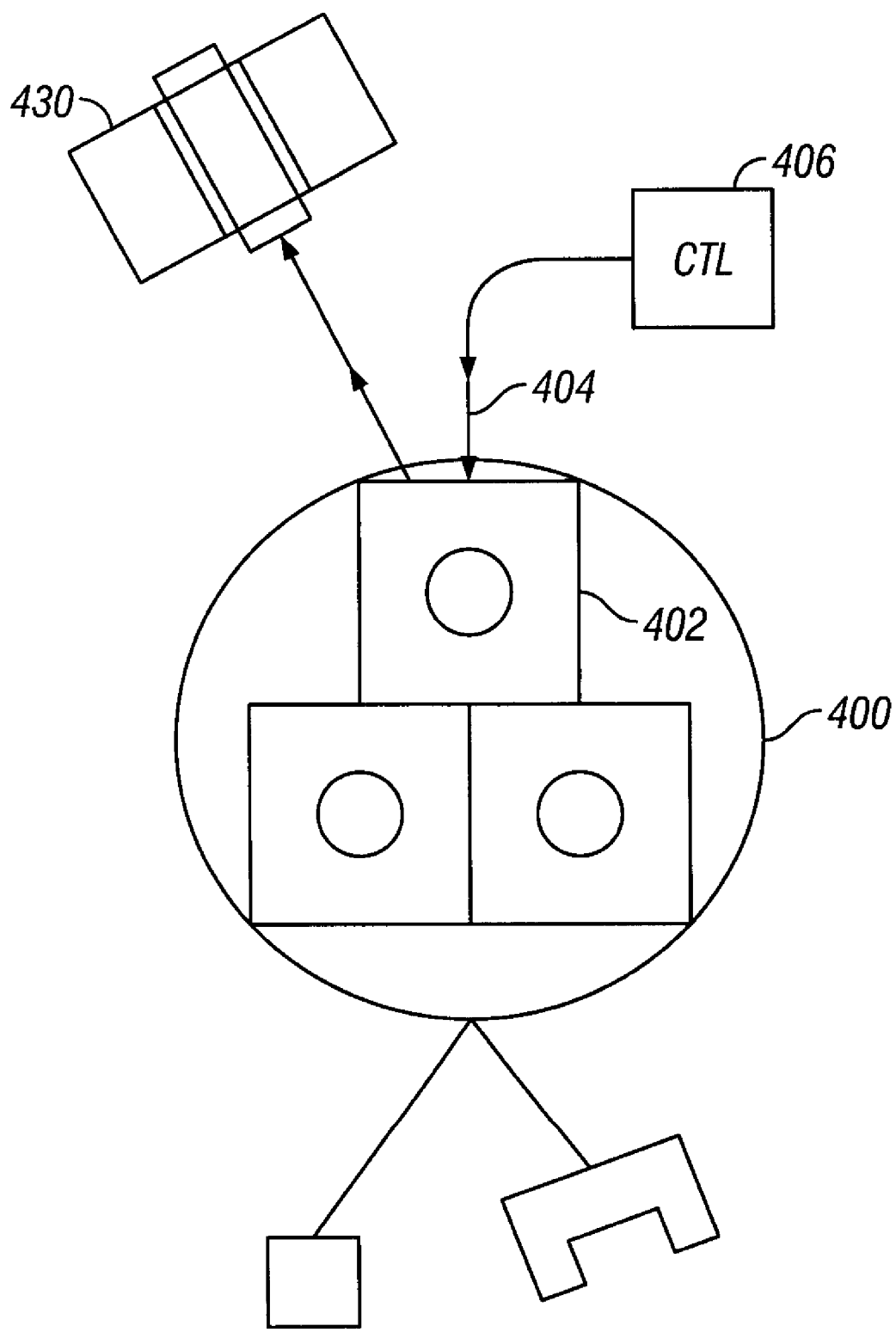
FIG. 4A shows a drawing of the preferred camera.

A second embodiment separates the images from the different apertures using rapid sequential imaging. An embodiment is shown in FIG. 4A. A scene is imaged through a mask 400 that includes multiple apertures. Each aperture has an associated selective blocking means 402. The blocking means is a device that either allows light to pass through the aperture or blocks light from passing through the aperture under control of an applied control signal 404 from a control element 406. The aperture blocking means 402 can be a mechanical blocker e.g. a mechanical shutter, solid state optics, such as a liquid crystal which is selectively allowed to pass light, or a digital mirror which selectively reflects the light to the aperture or the like. Light from the scattering sites is allowed to pass through each aperture at a separate time, under control of the controller 406. The passed light is sent to a single camera 430 that produces an image indicative of the passed light. Three different images are obtained at three different times. Each image is based on passage of the light through a different aperture.

Figure 5:
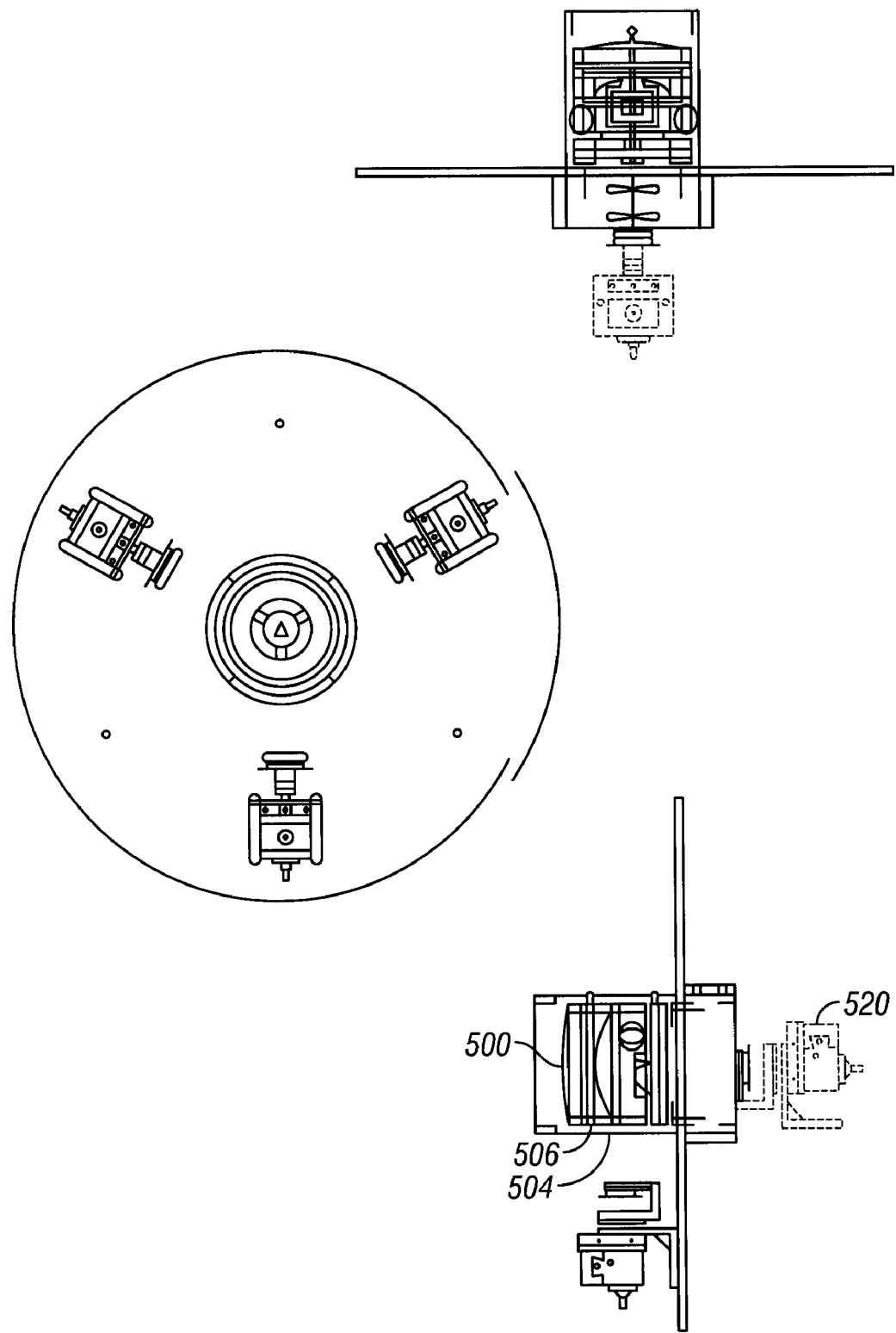
FIGS. 5 and 6 shows more detailed drawings of the optical relays of the camera shown in FIG. 4A.
Figure 6:
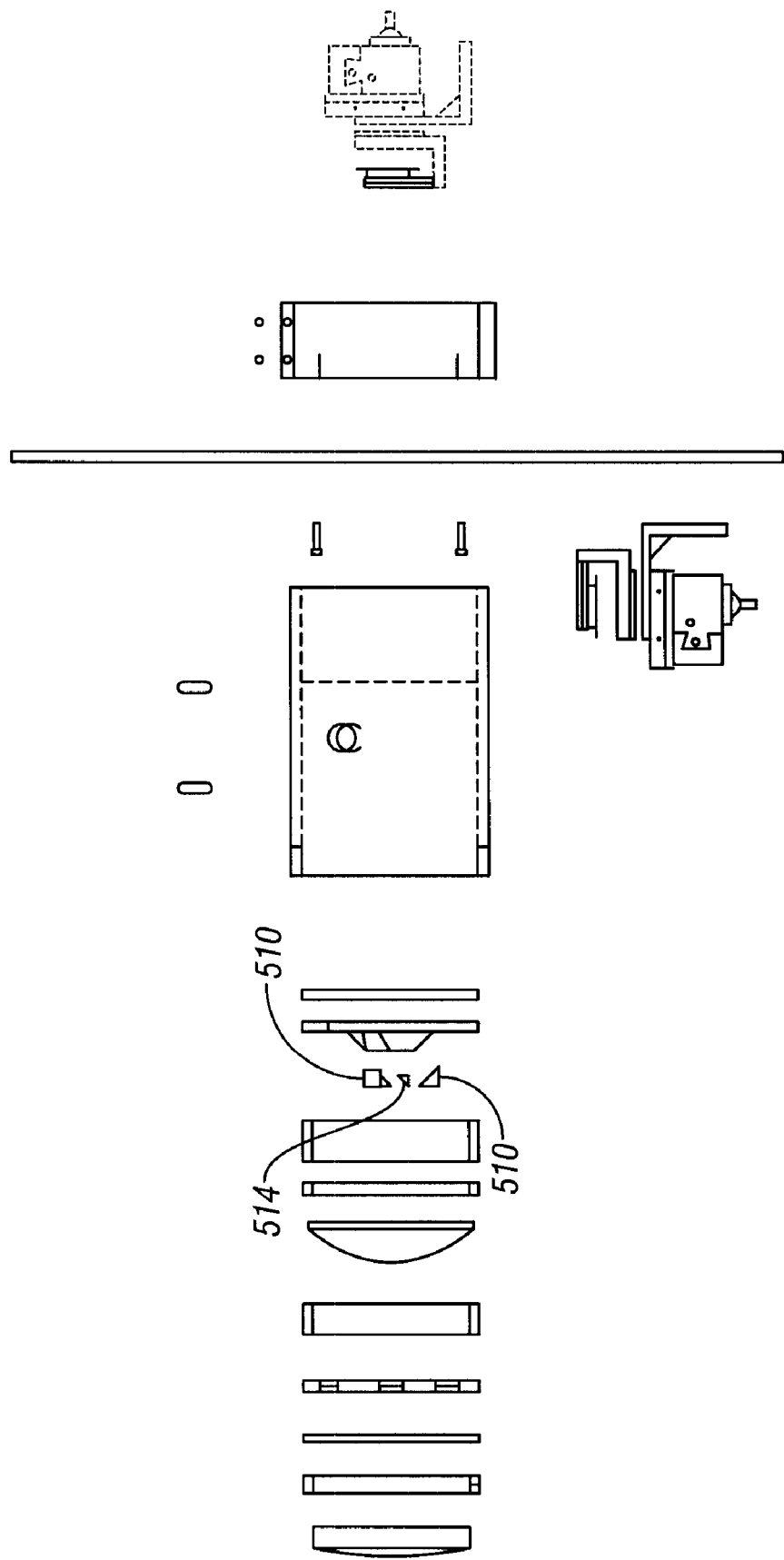

Another embodiment uses spatial filters to separate the different light values. FIG. 5 shows a preferred configuration of a spatially coded camera. The system includes a focusing lens assembly 500, 504, with an aperture system 506 between the two portions of the focusing lens 500, 504. An exploded view of the components is shown in FIG. 6. Each of the prisms, e.g. 510, is directly located behind each aperture orifice. A three CCD camera 520 views the three images through the three aperture orifices, thereby providing three simultaneous views of the image.

The lenses within the focusing lens assembly 500, 504 direct the scattered light from the scene through each of the three orifices at 120° angles with each other. The light is then collected through the aperture orifices and directed to the separate CCD cameras. Each of the images on each of the three cameras is recorded simultaneously and then processed to provide three dimensional spatial locations of the points on the scene.

An alternative, but less preferred embodiment, uses three separate cameras, in place of the one camera described above.

The system as described and shown herein includes several advantages. The system allows superior camera alignment as compared with other competing images such as stereoscopic techniques. This system is also based on a defocusing technique as compared with stereoscopic techniques that require that the camera be focused on the area of interest. This system has significant advantages since it need not be focused on the area of interest, and therefore has fewer problems with trade offs between aperture size and other characteristics.

Figure 7:
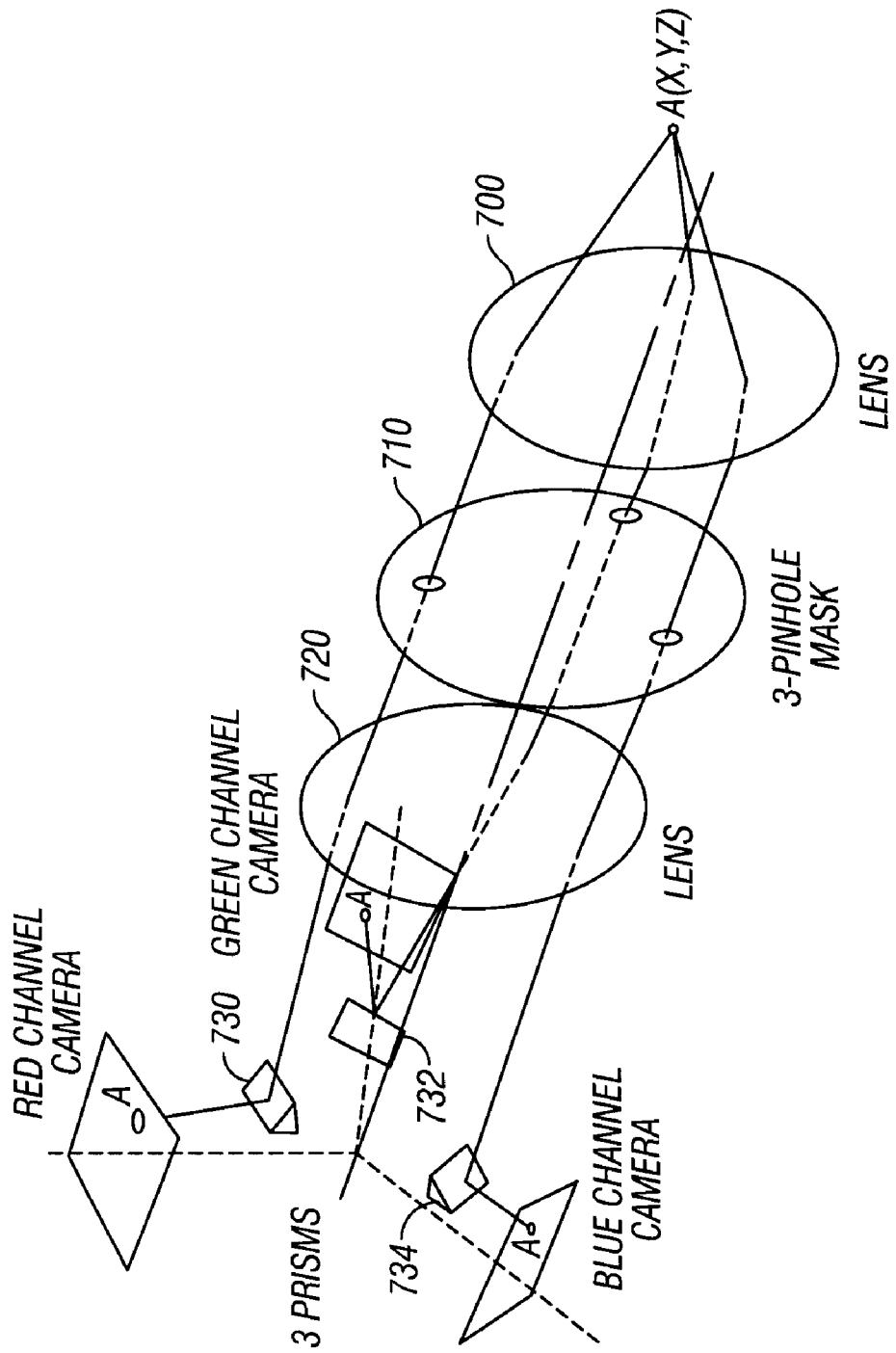
FIG. 7 is a schematic perspective view of the previously disclosed three-dimensional system, where one single lens is used with a three-aperture mask and a set of three separated cameras, each of which is associated with one aperture.

FIG. 7 shows a composite and changed version of this 3D camera using one single large lens 700 with a mask 710 with 3 apertures. This solution, depending on the application, may also require a lens assembly 720, where F#<1 (where F# is defined as f/d, where f is the lens' focal length, and d is the diameter of the lens). This latter lens may increase the cost of the assembly. In some embodiments, the lenses might need to be custom made.

In the FIG. 7 implementation, three prisms 730, 732, 734 are used to redirect the light away from the optical axis of the camera. This may simplify the design.

Figure 8A:
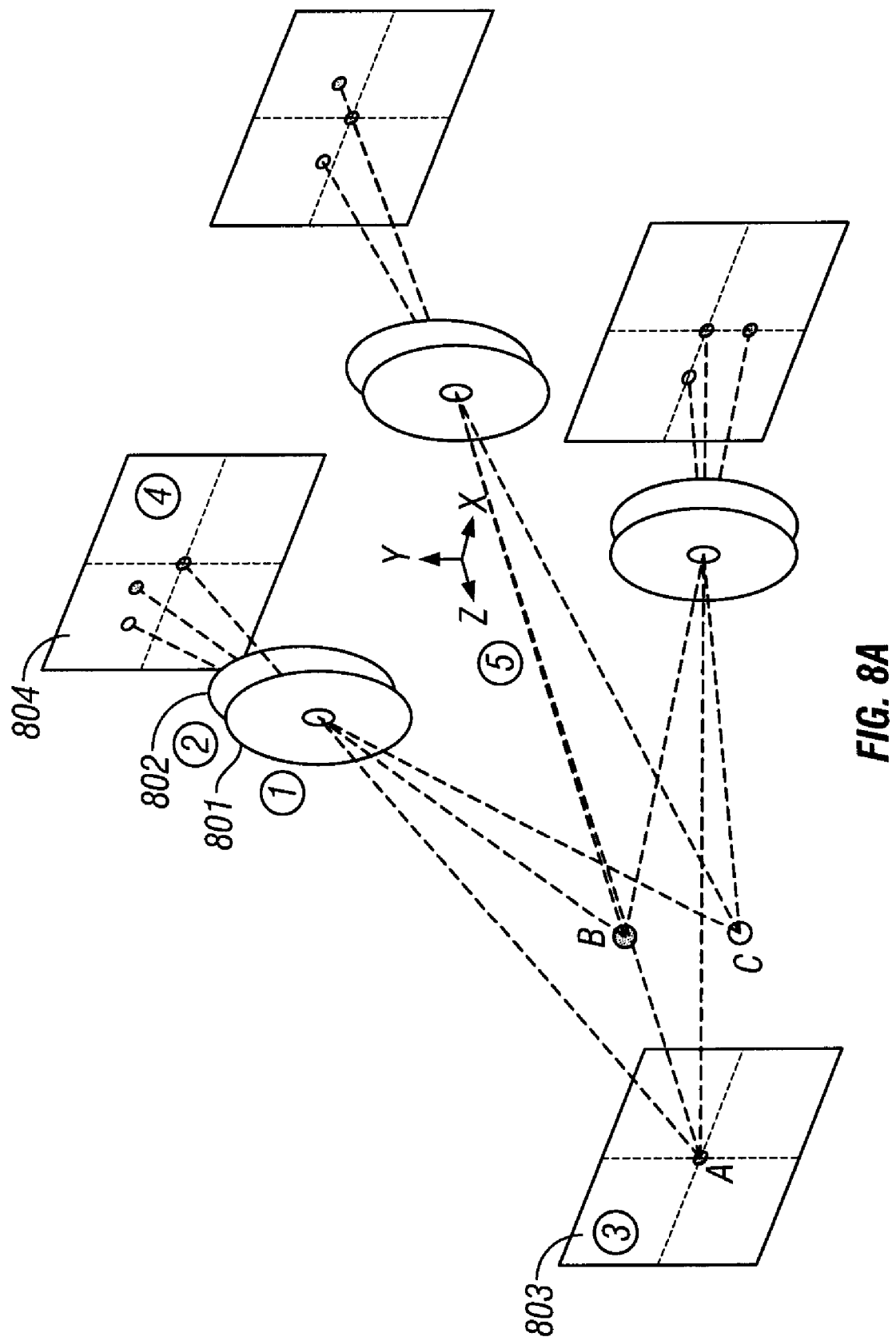
FIGS. 8A and 8B is a schematic perspective view of the present invention where 3 lens-aperture sets are used in combination with a set of three separated cameras, each of which is associated to one lens-aperture set. The drawing shows how the pattern defined by the geometry of the lens-aperture system (an equilateral triangle in this case) changes with the position in space of the corresponding source point.

Another design is shown in FIG. 8A. The camera in FIG. 8A is redesigned so that each photo sensor 804 has its own lens-aperture system 801, 802. Still, however, the global optical axis of the camera is preserved and is unique. The system behaves as if we had replaced the original lens by a lens with infinite focal length. The use of small lenses 802 in front or behind the apertures 801 may also improve the collection of light as to produce small images on the imaging sensors 805, which allows the use of variable apertures and therefore allows to work in a wide range of lighting conditions. The flexibility of this lens assembly allows for more accurate 3D imaging, as no complex optics are used, thus minimizing the optical imperfections, making the manufacturing easier and the system ruggedized for field applications where environmental concerns are an important factor. Moreover, the geometrical parameters can be freely modified to match the specific requirements of the application, such as size of volume, depth resolution, etc.

Figure 8B:
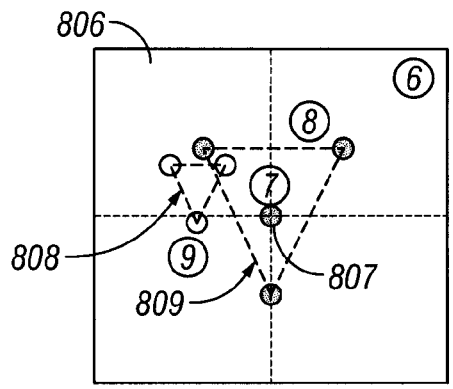

The present embodiment preserves the same geometrical information as in the original design. In this arrangement, the 3 imaging sensors are arranged so that they form an equilateral triangle. FIGS. 8A and 8B show how a point A placed on the reference plane 803 is imaged as one unique image 807 on the combined imaged 806. Points B and C placed in between the lens-aperture plane and the reference plane will image as equilateral triangles 808 and 809, respectively. This is due to the fact that the 3 imaging sensors were arranged to form an equilateral triangle, thereby resulting in the equilateral triangles shown by 808 and 809. The size and the centroid of such triangles are directly related to the depth and plane location of the corresponding source point, respectively. It is understood that there would be such triangle patterns for any source point, each of them uniquely identifiable, making the invention suitable for the instantaneous mapping of large number of points, and consecutively suitable for real-time imaging of such sets at a frame rate defined either by the recording capabilities or by the dynamical system under observation. It is important to note that the arrangement of the 3 imaging sensors in the form of an equilateral triangle is not unique, and that any identifiable pattern could have been chosen.

This present embodiment allows for the 3 separate sensor/lens assemblies to be movable while maintaining the same geometric shape. For example, if the 3 sensor/lens sets are arranged so that they outline an equilateral triangle of a certain size, the 3 sensor/lens assemblies can be moved, thus allowing for visualizing smaller or larger volumes, in a manner that will preserve the equilateral triangle in their outline. Furthermore, the lens/pinhole assembly will be interchangeable to allow for imaging of various volume sizes. Such features will also allow the user to vary the working distance at their convenience.

Such improvements make the proposed system a new invention as it offers an improvement over the previous embodiments.

It is emphasized again that the choice of an equilateral triangle as the matching pattern, or equivalently of the number of apertures/imaging sensors (with a minimum of two), is arbitrary and is determined based on the needs of the user. It is also emphasized that the shape of the apertures is arbitrary and should only be defined by the efficiency in the collection of light and image processing. Furthermore, these apertures can be equipped with any type of light filters that would enhance any given features of the scene, such as the color. It is furthermore understood that the size of such apertures can be varied according to the light conditions, by means of any type of mechanical or electro-optical shuttering system. Finally, it is emphasized that the photo sensors can be of any sort of technology (CCD, CMOS, photographic plates, holographic plates . . . ) and/or part of an off-the-shelf system (movie cameras, analog or digital, high speed or standard frame rate, color or monochrome). This variety of implementations can be combined to map features like the color of the measured points (for example in the case of measuring a live face), their size, density, etc.

Figure 9:
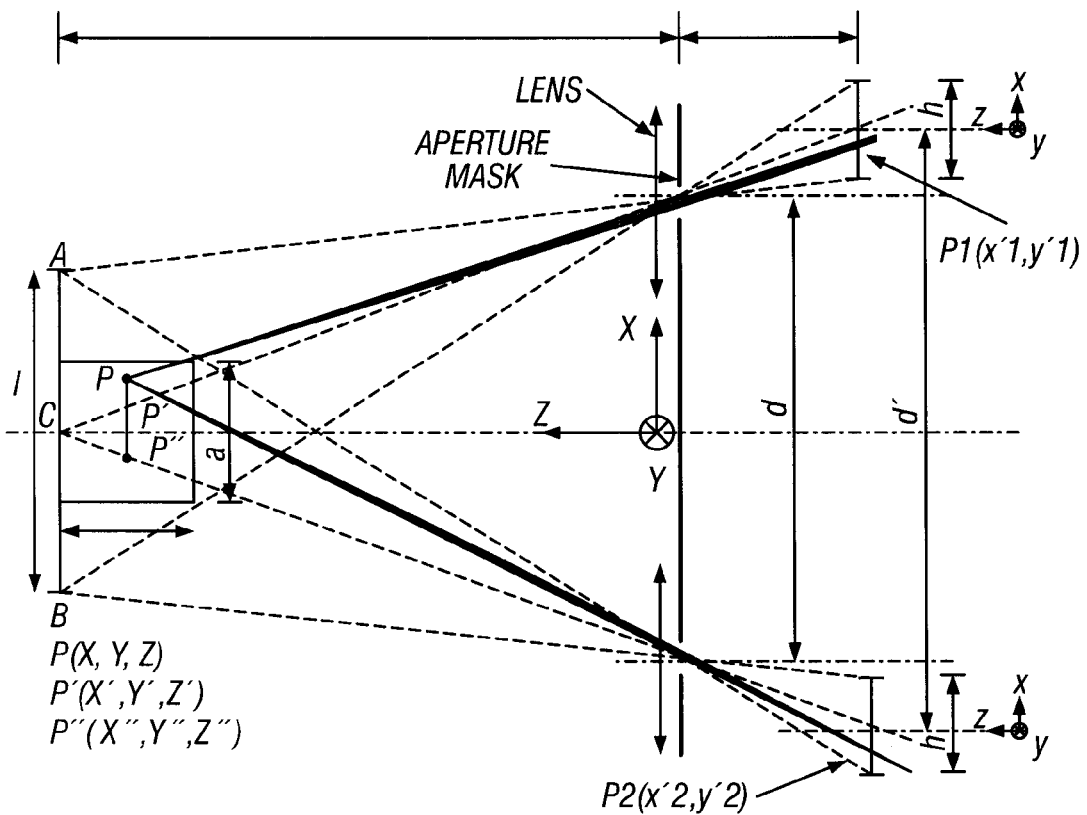
FIG. 9 is geometrical model of the present invention, using the 2-aperture arrangement for sake of clarity, and displaying all the parameters defining the optical principle of defocusing and upon which the present invention will be described in the following sections. The same parameters apply to a system with more than 2 lens-aperture systems.

FIG. 9 illustrates a 2 lens-aperture set. For this purpose, a simplified geometric model of a two-aperture defocusing optical arrangement is represented in FIG. 3. The interrogation domain is defined by a cube of side a. The back face of this cube is on the reference plane, which is placed at a distance L from the lens plane. The image plane is materialized by a photo sensor (e.g. CCD) of height h. Let d be the distance between apertures, f the focal length of the converging lens and l the distance from the lens to the image plane. The physical space is attached to a coordinate system originating in the lens plane, with the Z-axis on the optical axis of the system. Coordinates in the physical space are designated (X,Y,Z). The image coordinate system is simply the Z-translation of the physical system onto the sensor plane, i.e. at Z=−1. The coordinates of a pixel on the imaging sensor are given by the pair (x, y). Point P(X,Y,Z) represents a light scattering source. For Z<L, P is projected onto points P1(x'1, y'1) and P2(x'2, y'2), such that $$P_1 = \begin{cases} x'_1 = \frac{M}{2Z}[d(L-Z) - 2LX] \\ y'_1 = -l\frac{Y}{Z} \end{cases}$$

$$P_1 = \begin{cases} x'_2 = \frac{M}{2Z}[-d(L-Z) - 2LX] \\ y'_2 = -l\frac{Y}{Z} \end{cases}$$

where M is the magnification. The separation b of these images on the combined image (as in part 6 of FIG. 2 for a 3 lens-aperture system) is then defined by $$b\begin{pmatrix} b_x \\ b_y \end{pmatrix} = \begin{pmatrix} x'_1 - x'_2 \\ y'_1 - y'_2 \end{pmatrix}$$

$$b = \frac{Md}{Z}(L-Z).$$

Such definitions are identical to the previous formulation for the previous embodiments.

FIG. 9 shows a geometric diagram of the aperture mask.

Figure 10:
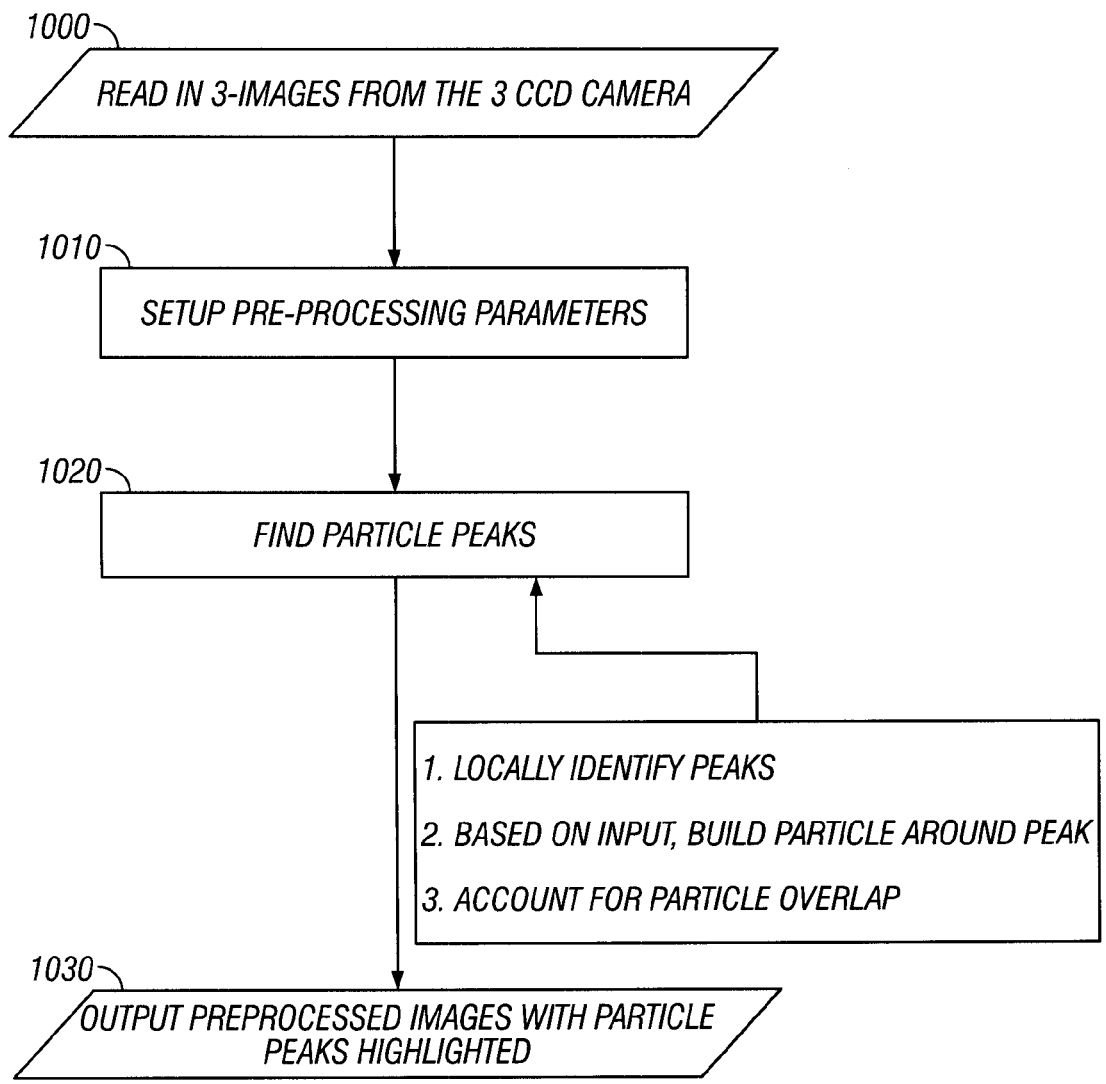
FIG. 10 is a flow diagram showing the sequence of program routines forming DE2PIV and used in the preprocessing of the combined images provided by a system with 3 lens-aperture sets.

The image and information that is obtained from this system may be processed as shown in the flowcharts of FIGS. 10-14. In FIG. 10, step 1000 defines reading in three images from the three CCD cameras of any of the previous embodiments. At 1010, preprocessing parameters may be set up which may be used for noise processing, and background image removal. Particle peaks are identified at 1020. These particle peaks may be identified by locally identifying peaks, building a particle around each peak, and then accounting for particle overlap. In this way, preprocessed peaks are obtained at 1030, with the particle peaks being highlighted.

Figure 11:
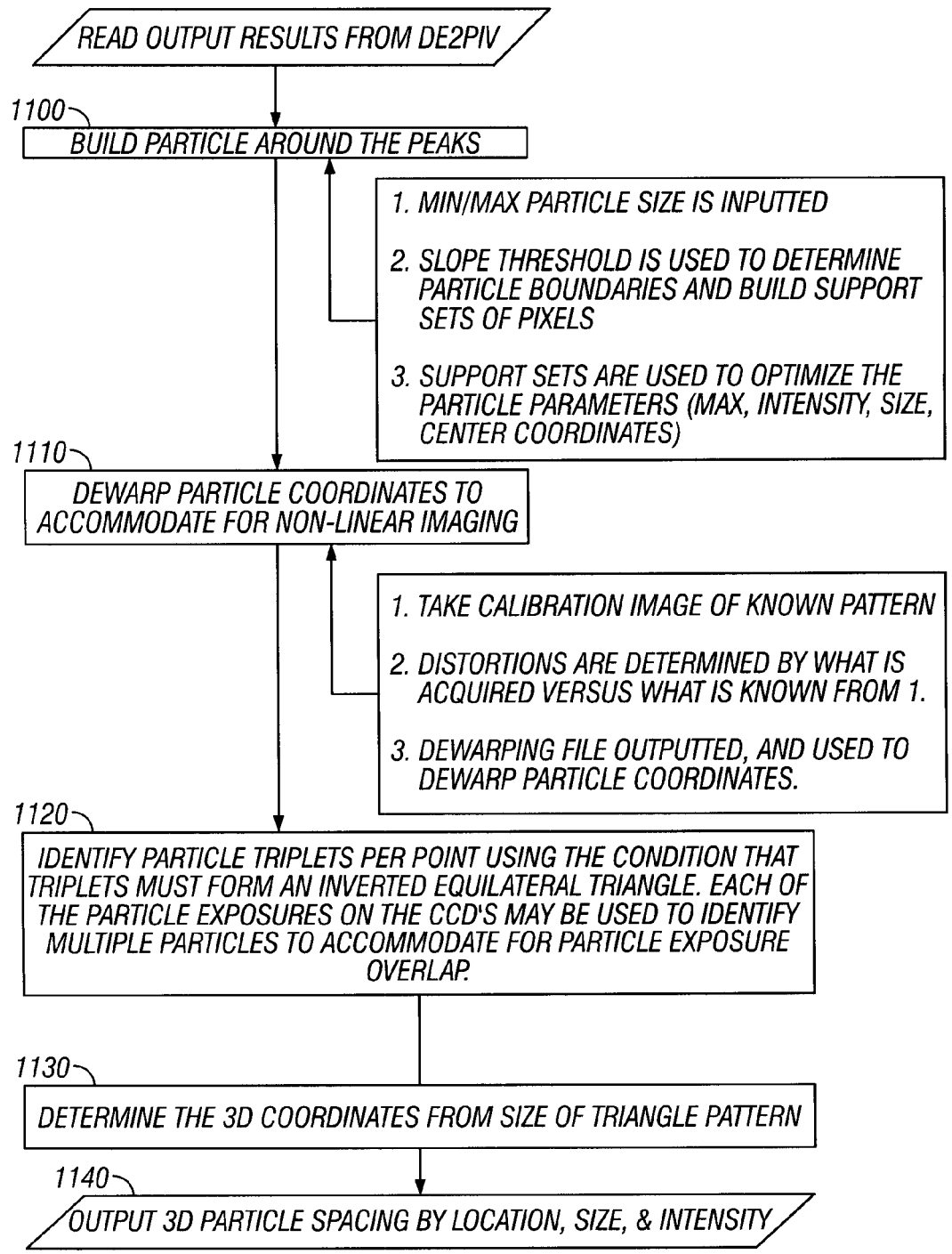
FIG. 11 is a flow diagram showing the sequence of program routines forming FINDPART and used in the image processing of the preprocessed images provided by DE2PIV. The program determines the three-dimensional coordinates of the scattering sources randomly distributed within a volume or on a surface.

These results are input to the second flowchart part, shown in FIG. 11. At 1100, a particle is built around the peaks, using the minimum and maximum particle size. A slope threshold is used to determine the particle boundaries, and to build support sets around the pixels. These support sets are used to optimize the particle parameters such as maximum, intensity, size and center coordinates. At 1110, the particle coordinates are "dewarped". This is done by using a calibration image of a known pattern. Distortions are determined by what is acquired as compared with what is known. The warped file is then output. The warping may thus accommodate for nonlinear imaging.

At 1120, particle triplets per point are identified. This may be done using the conditions that triplets must form an inverted equilateral triangle. Each of the particle exposures on the CCD's may be used to identify particles to accommodate for particle exposure overlap. At 1130, the three-dimensional coordinates are obtained from the size of the triangle pattern, and the 3-D particle spacing is output at 1140 based on location.

Figure 12:
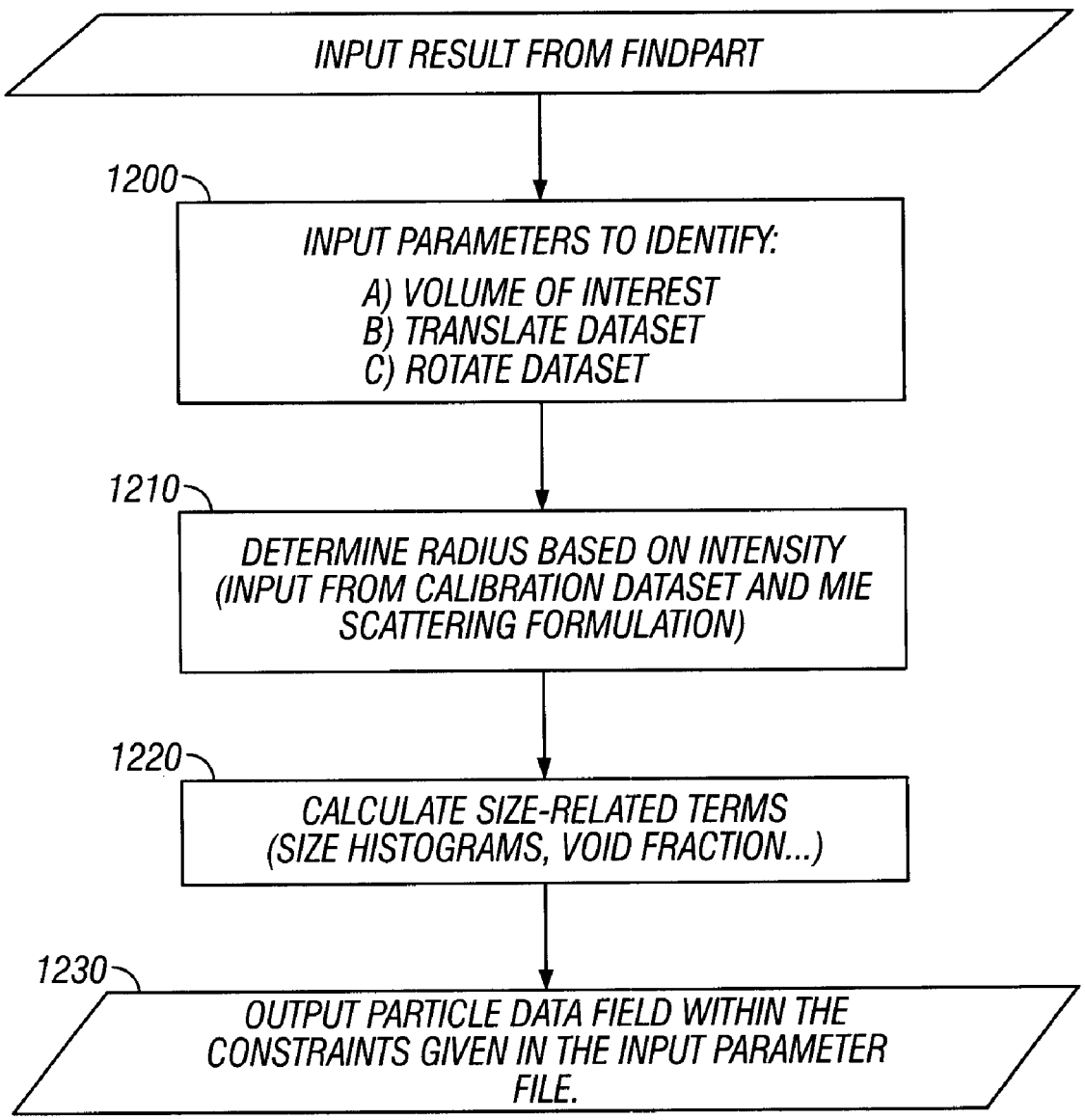
FIG. 12 is a flow diagram showing the sequence of program routines forming FILTERPART and used in the processing of the results provided by FINDPART. Operations such as volume-of-interest, source characterization, 3D geometrical operations, are possible.

In FIG. 12, the thus obtained results are further processed at 1200 identify the volume of interest, to translate the data set, and to rotate the data set. A radius is determined at 1210 based on intensity as input from the calibration data set and the scattering formulation. The size related terms determined at 1220 such as size histograms and void fraction. At 1230, an output particle data field is obtained within the constraints given in the input parameter file.

Figure 13:
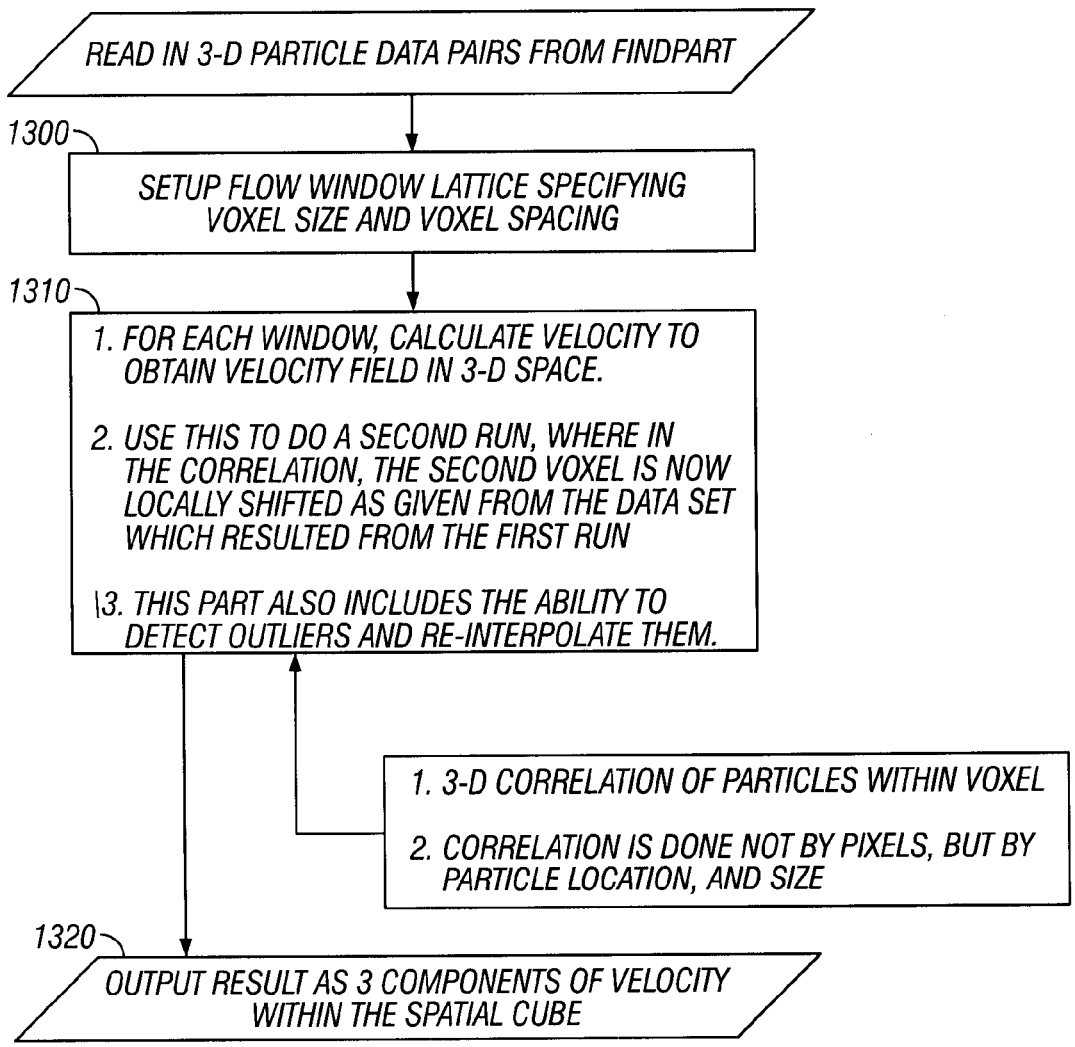
FIG. 13 is a flow diagram showing the sequence of program routines forming FINDFLOW and used in the processing of the results provided by FILTERPART. The program calculates the 3D displacement of the scattering sources as a function of time, i.e. the 3D velocity.

Three-dimensional particle data pairs are thus obtained and are fed to the flowchart of FIG. 13. In FIG. 13, at 1300, flow window lattice information is set up to specify Voxel size and Voxel spacing. For each window, the velocity is calculated in 3-D space at 1310. This may be done once or twice. In the second calculation, the second voxel may be locally shifted. This may be used to detect outliers and reinterpret those values. In general, this uses three-dimensional correlation of particles with in the Voxel. The correlation is not done by pixels, but rather by particle location and size. The results are output at 1320 as components of velocity within the spatial P2.

Figure 14:
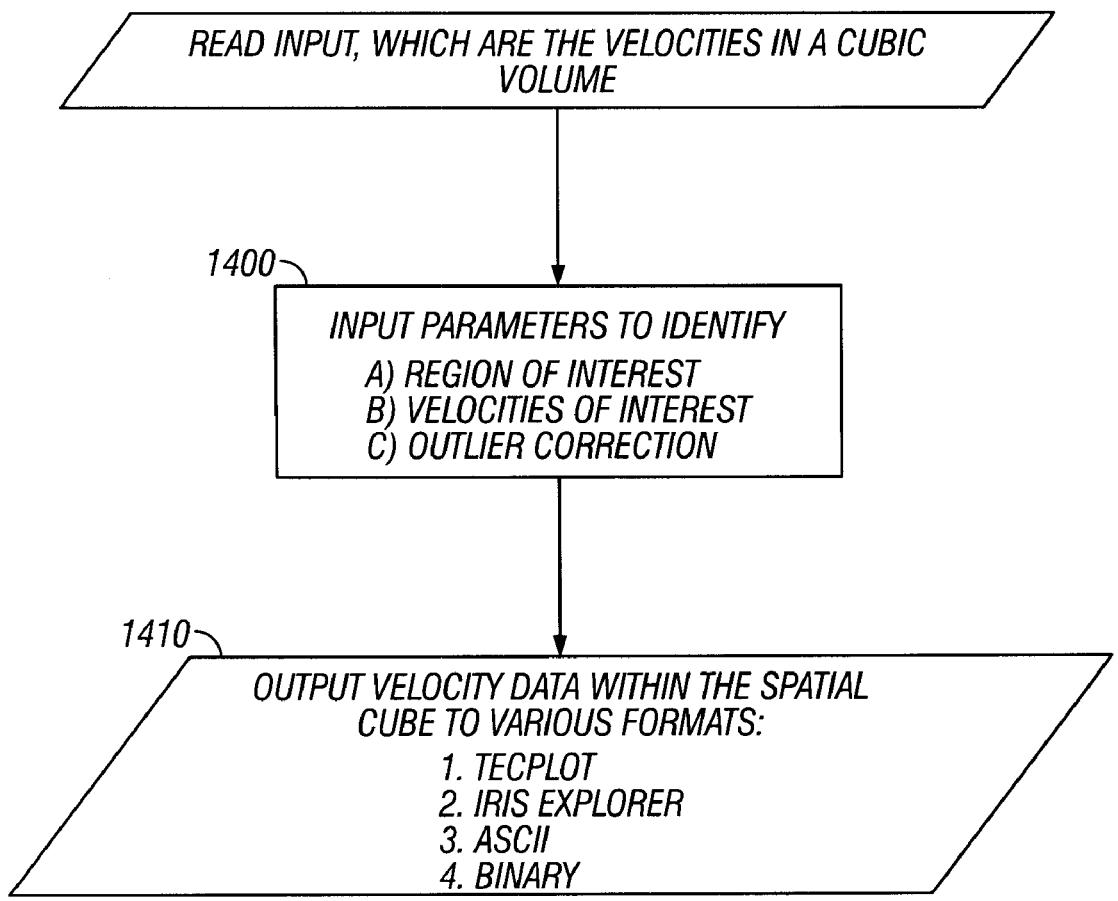
FIG. 14 is a flow diagram showing the sequence of program routines forming FILTERFLOW and used in the processing of the results provided by FINDFLOW. The program validates the results and outputs the data to various standard formats. Every dataset of scattering sources is characterized by a 3D vector field comprising the 3D coordinates of every source, the 3D velocity.

Filtering is carried out in FIG. 14. Again, the input parameters at 1400 may include a region of interest, velocities of interest, and outlier correction. The velocity data may be output into various formats at 1410.

Figure 15A:
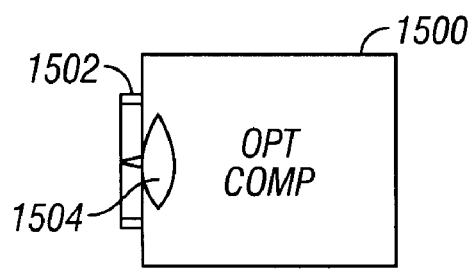
FIGS. 15A and 15B show an embodiment which uses different areas of the imager for different imaging.
Figure 15B:
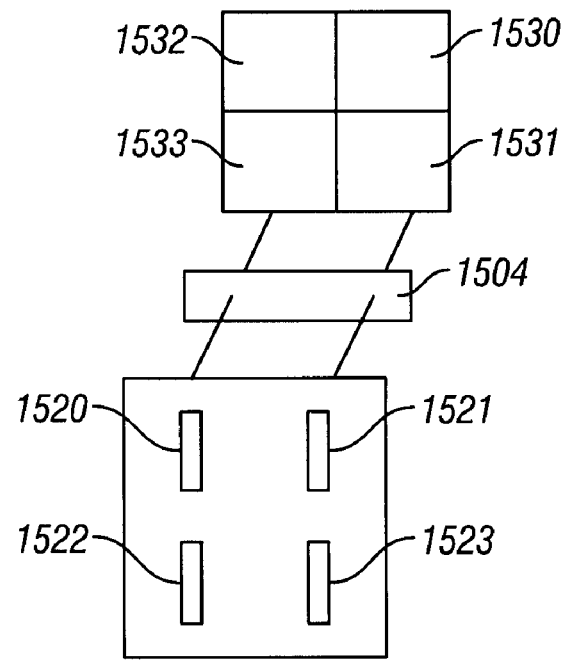

Another embodiment is illustrated in FIGS. 15A and 15B. The embodiment may allow forming a more compact system. An optical component 1500 can be, for example, a photographic device such as a photographic objective or an optical microscope. The optical component has an input aperture 1502 which includes or is replaced by an aperture mask, of the type shown in any of the previous embodiments of FIGS. 1 through 14.

Figure 16:
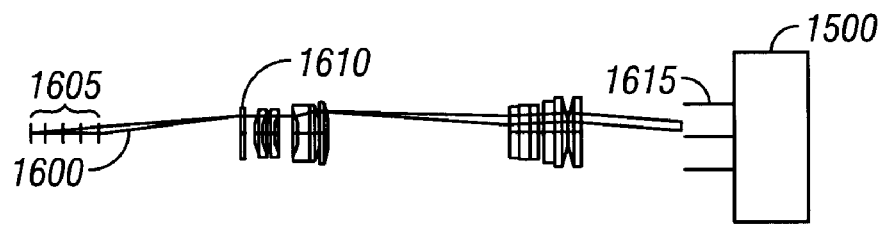
FIG. 16 shows an embodiment of a close up lens.

In one embodiment, the optical component 1500 imager is an off-the-shelf imager using a close-up photography lens system 1504. This lens system may be of the type described in U.S. Pat. No. 6,124,990, for example, that uses two groups of lenses separated by a relay lens. FIG. 16 illustrates how the optical lens in such a system would operate. Rays 1600 emanating from different points 1605, along the axis of the optical system, experience a lateral shift on the imager as a result of the off axis aperture 1610. FIG. 16 illustrates only a single aperture 1610 for clarity. However, in general, multiple apertures could be located on the same surface so that a single point in space will result in multiple images.

In this embodiment, the optical crowding may be avoided by optically separating the aperture images into different areas on the imager 1500. 1615 exaggerates the optical separation. For example, a range of depths inside the defocused region of the lens allows the images to map to different areas. In one embodiment, for example, there may be 4 apertures of this type arranged rectangularly, as shown at 1520, 1521, 1522, and 1523 in FIG. 15B. The lensing system 1504 may map these uniquely to different quadrants 1530-1533 of the imager.

Hence, this embodiment allows a single imager to take the place of the multiple different imagers in the previous embodiments. Each aperture forms an image in only a specific portion of the imager. In an embodiment, these portions do not overlap. Thus, this prevents mixing of the images, and allows using a single imager as a multiple imager arrangement and may prevent image crowding with only a single imager. In this way, a single, high pixel count imager can be used in place of the multiple imagers, or sequential imaging, of the embodiments of FIGS. 1-14.

Another embodiment, illustrated in FIG. 17, uses any of the embodiments of FIGS. 1-16 as parts of a wholly underwater three-dimensional camera. This system is formed of a completely enclosed watertight housing 1700 holding the multiple aperture camera 1700. The camera housing 1700 is located on one side of the device. A water-tight illumination device 1705 is located on the other side. The camera 1700 and illumination subsystem 1705 are coupled together by a rigid frames 1710. This system can be attached, for example, to a naval vessel 1720, and may provide illumination and imaging to be used for measurements on naval vessels.

In embodiments such as the underwater embodiment, the connection of the camera may use micropositioners as described in previous embodiments, or may fix the imagers directly to the aperture plates using a more permanent and rigid connection such as bolts, screws, glue or the like. This permanent connection may be used with any of the embodiments described herein, including any of the embodiments of FIGS. 1-17. Permanent connection may reduce chances of jarring, misalignment, or negative effects from prolonged vibration. Certain installations, such as in a naval vessel may require such vibration resistance. Hence, this embodiment may be quite appropriate for use in the FIG. 17 embodiment, and also in any camera system that is meant to be a long-term addition. The permanent installation technique may also increase the necessary time between calibrations.

Many of the embodiments above have described three apertures arranged in an equilateral triangle. However, other embodiments may use different aperture arrangements. Any number of off-axis apertures can be used in different embodiments arranged in any shape. Equilateral apertures may produce advantages, and hence off axis. apertures in a rectangular, pentangle or other shape may also be useful. FIG. 18A illustrates the use of a rectangular arrangement of apertures 1800, 1801, 1802, 1803, which is lensed via lens 1805 to an imager 1810.

One specifically preferred non-equilateral embodiment is a linear arrangement in which apertures are co-linearly arranged, shown as 1820 in FIG. 18B. This arrangement can allow a very compact form factor for the eventual camera. This arrangement, however, might have the potential of decreasing spatial sensitivity as compared with an equivalent equilateral arrangement. While not as good as an equilateral arrangement, this system would be much more sensitive to depth than a single lens off-the-shelf camera. Hence, this system could be used for larger volume measurements using an arrangement that is more compact than an equilateral arrangement. This system is compact enough to allow for streamlined housing designs which can be critical for hydrodynamic and aerodynamic field measurements, as well as lab scenarios, in facilities such as tow tanks, where the imaging system must be submerged. In this and other lab techniques, the size of the unit should be small to avoid the equipment interfering with the experiment.

Another embodiment forms a dynamic standalone system by combining two or more inexpensive imagers such as Web cams. A computer monitor which views the Web cams can be used as a frame as a structure for the aperture plate.

An inexpensive pattern projector, such as a liquid Crystal projector or a laser diode can also be used to project a pattern on the object to be mapped. Any household computer can then be used for the 3d formation process.

This system can then be used for live immersion into virtual reality domains, video games or similar embodiments by allowing 3D imaging of a persons real features, and incorporation into the game environment. In an embodiment, at least one of the imagers is a color imager to produce a color photograph that can be superimposed over 3-D data to yield a photorealistic model of a person or object being imaged. An advantage of this embodiment is therefore its ability to capture 3-D data in dynamic situations using inexpensive imagers.

Another embodiment may use any of the disclosed embodiments in a medical application, such as a plastic surgeon. The plastic surgeon may obtain several sets of images which can be captured in a few seconds depending on the imager. This embodiment can be used as a small practical system in a plastic surgeon's office to demonstrate changes to a patient's body in three dimensions.

In the gaming or virtual reality embodiments, speed and cost may be more important. Hence, another embodiment modifies the above to map without a pattern projector, just using known features from a person's face such as eyes, skin texture mouth, etc., for the 3-D mapping.

When resolution becomes more critical in applications such as mapping an actor or athlete's face for inclusion in a video game, a one color camera system may be used for capturing textures such as actors skin and eyebrows, and/or three-dimensional information. The latter three-dimensional information may be a point cloud representing the actor's face or body. This may be captured at several frames per second, to be constructed later in post processing. Different applications are contemplated including real-time analysis of three-dimensional characteristics, mapping of the characters face and body for inclusion in a game or other three-dimensional computer world, or mapping movements of real actors to be used in studies to guide computer animators in creating entirely fictional three-dimensional characters.

Embodiments described above explain how the focusing is used to uncrowd the image. In another embodiment, the measurement domain remains within the defocused region, but the images themselves need not be defocused. An off axis distance of each aperture may determine the spatial sensitivity of the system. The aperture sizes can be set, for example by trial and error, to a minimum size that is appropriate for a predicted lighting situation. Smaller apertures may increase the depth of field, and hence this system can image the region of interest entirely in the defocused domain. Even if there are sharp edges or points, the sharp points can remain defocused.

In a situation with sufficient illumination, this embodiment may reduce optical aberrations which may become exaggerated with an off axis shift. For example, the diagram of FIG. 2 shows that where the aperture distance to the axis is increased relative to the diameter of the optical lens, then the diameter of the orifice becomes small. Point sources at the shown depths are all imaged very sharply.

Another embodiment allows extending the 3-D information from images. The previous embodiments suggested imaging sets of dots that are created by projecting a pattern on the surface or from illumination of small tracer particles or bubbles. If the object to be imaged is not transparent, for example, if it has even a slight texture on its surface, then a direct image correlation can yield an appropriate 3-D map of the surface. This may be appropriate, for example, for objects whose surface roughness would preclude the placement or projection of dots on the surface. It may be preferable to use tracer particle images or dots, since this may enable faster computation and higher accuracy. However, there are applications when imaging the face roughly at high speed may be superior. Projection of the pattern may result in discomfort, because of its eye level proximity, or the very projection may make certain users feel uncomfortable.

In the flow measurement application, the system can obtain images of tracer particles or bubbles. The domain does not need to be divided into a spatial cross correlational domain. Instead, especially in cases where seeding density is low, direct tracking of the particles in space can be performed. If the seeding is dense enough for crosscorrelation, then the crosscorrelation can be used as a starting point for the particle tracking. This particle tracking may then yield a much more spatially detailed vector field.

Different aspects of this system may rely on calibration. A new calibration technique is disclosed herein, usable with any of the previous embodiments. The calibration technique images unknown grid pattern at several depths. It uses the systems described above to correct for sensor misalignment and optical aberration at each plane independently. During measurement, the calibration is applied in an interpolated fashion. Areas between planes are corrected by using two or more of the nearest calibration planes. The correction at each plane is calculated at multiple orders to find mathematically the maximum possible improvement.

For systems that are intended to be immersed in some media, such as air or water, the multiplane calibration need only be performed once in each media. However, systems intended for different kinds of media, may require multiple calibrations. For example, a lab setting may require an experiment in water through a glass wall while sitting in the air. The calibrations in this case may be performed as a function of the thickness of the wall, the distance to the wall of the tank, and with appropriate mediums in each of the different regions.

Calibration is applied in practice by roughly searching for particles, then by checking each rough particle against the corrected particle with a much tighter tolerance than previously possible.

The general structure and techniques, and more specific embodiments which can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other shapes of aperture arrangements can be used and different kinds of cameras can be used. The system can use any kind of processor or microcomputer to process the information received by the cameras. The cameras can be other types that those specifically described herein. Moreover, the apertures can be of any desired shape.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific value is mentioned herein, it should be considered that the value may be increased or decreased by 20%, while still staying within the teachings of the present applications unless some different range is specifically mentioned.

What is claimed is:

1. A method, comprising:
   imaging a scene using a plurality of the apertures arranged in a pattern of a specified shape by allowing light from the scene to pass only through the plurality of apertures onto an imager;
   associating each of the apertures with a different and separate portion of the imager, so that light which passes through each aperture is imaged on a different portion of the imager;
   capturing light reflected from or emitted by a large plurality of isolated distinguishable points of the scene that pass through each of the plurality of apertures and that is received at the imager as a plurality of isolated distinguishable point images, the isolated distinguishable point images each including a number of image points that is equal to a number of the plurality of apertures; and analyzing each image point in each isolated distinguishable point image from the imager to determine relative positions of each isolated distinguishable point in the scene relative to each other isolated distinguishable point in the scene to map a complete three dimensional image of the scene.

2. A method as in claim 1, wherein the apertures are arranged into an equilateral triangular arrangement.

3. A method as in claim 1, wherein the apertures are arranged into a square arrangement.

4. A method as in claim 1, wherein the apertures are arranged linearly along a line.

5. A method as in claim 1, further comprising providing a lens system between at least a plurality of said apertures and said imager.

6. A method as in claim 1, wherein said lensing system is a lens system intended for close-up imaging.

7. A method as in claim 1, further comprising watertight encasing the imager prior to imaging, and also forming an illumination system which is also watertight.

8. A method of as in claim 7, further comprising calibrating an underwater operation of the system, by imaging grid patterns at multiple depths.

9. A method of as in claim 1, further comprising calibrating an operation of said system, by imaging grid patterns at multiple depths.

10. The method in claim 1, further comprising repeating the method as recited in claim 1 to map multiple three dimensional images of the scene and viewing the multiple three dimensional images sequentially as a dynamic three dimensional representation of the scene.

11. The three dimensional camera device as in claim 1, wherein the processor further comprises programming to map multiple three dimensional images of the scene and to present the multiple three dimensional images sequentially as a dynamic three dimensional representation of the scene.

12. A three-dimensional camera device, comprising:
an imaging device;
an array of apertures, arranged in a pattern having a specified shape, arranged between said imaging device and a scene;
a lens part, the lens part, the imaging device and the apertures being arranged to capture light reflected from or emitted by a large plurality of isolated distinguishable points of the scene that pass through each of the plurality of apertures and that is received at the imager as a plurality of isolated distinguishable point images, the isolated distinguishable point images each including a number of image points that is equal to a number of the plurality of apertures; and
a processor to analyze each image point in each isolated distinguishable point image from the imager to determine relative positions of each isolated distinguishable point in the scene relative to each other isolated distinguishable point in the scene to map a complete three dimensional image of the scene.

13. A device as in claim 12, further comprising a computer controlled part, which analyzes information from the different parts, and produces three-dimensional object information therefrom.

14. A device as in claim 12, wherein said apertures are arranged in an equilateral arrangement.

15. A device as in claim 12, wherein said apertures are arranged linearly along a line.

16. A device as in claim 12, wherein said lensing part is a close-up imaging lens.

17. A device as in claim 12, further comprising a waterproofing part, associated with waterproofing said imaging device and said illumination part.

18. A device as in claim 12, wherein said lens part includes two groups of lenses and a relay lens between said two groups of lenses, said lens part optimized for close up imaging.

19. A three-dimensional camera device, comprising:
a first imaging device;
a second imaging device;
an array of apertures, arranged in a specified shape relative to one another, and arranged between at least said first imaging device and a scene; and
a lens part, passing light which has passed through said apertures to at least one of said imaging devices so that said at least one imaging device obtains multiple images of the scene;
wherein at least the second imaging device is a color imaging device and the second imaging device acquires a color pictorial image of the scene, and
a processing part, which processes information from at least said first imaging device to obtain three dimensional information from said multiple images of the scene, and processes the three dimensional information and the color image of the scene acquired from the second imaging device to overlay the color image from said second imaging device with said three dimensional information, to form a composite image.

20. A device as in claim 19, wherein said lens part operates in a way such that light from each of said apertures is received on a different part of said imaging device and such that there is no overlap on said imaging device between areas which receive light from the different apertures.

21. A device as in claim 19, further comprising at least one additional imaging device, each imaging device associated with one of said apertures.

22. A device as in claim 19, wherein said at least one imaging device obtains images from different apertures at different separated times via a shutter that opens the different apertures at the different separate times.

* * * * *